(12) United States Patent
Lei et al.

(10) Patent No.: US 9,641,380 B2
(45) Date of Patent: May 2, 2017

(54) SPANNING TREE PROTOCOL (STP) IMPLEMENTATION ON AN EVENT DRIVEN VIRTUAL LINK AGGREGATION (VLAG) SYSTEM

(71) Applicant: Lenovo Enterprise Solutions (Singapore) Pte. Ltd., Singapore (SG)

(72) Inventors: Bao Lei, Wuxi (CN); Ren J. Yao, Wuxi (CN); Tamanna Z. Sait, San Jose, CA (US); Venkatesan Selvaraj, Sunnyvale, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 380 days.

(21) Appl. No.: 14/065,253

(22) Filed: Oct. 28, 2013

(65) Prior Publication Data

US 2014/0211663 A1    Jul. 31, 2014

Related U.S. Application Data

(63) Continuation of application No. 13/754,749, filed on Jan. 30, 2013.

(51) Int. Cl.
*G06F 15/177* (2006.01)
*H04L 29/08* (2006.01)
(Continued)

(52) U.S. Cl.
CPC ...... *H04L 29/08081* (2013.01); *H04L 45/245* (2013.01); *H04L 43/0817* (2013.01); *Y02B 60/33* (2013.01)

(58) Field of Classification Search
CPC . H04L 45/245; H04L 45/24; H04L 29/08081; H04L 49/70; H04L 45/586;
(Continued)

(56) References Cited

U.S. PATENT DOCUMENTS 7,869,432 B1 *  1/2011  Mollyn ............... H04L 12/4625
                                                        370/221
7,944,913 B2    5/2011  Ogasahara
(Continued)

OTHER PUBLICATIONS

Lei et al., U.S. Appl. No. 13/754,749, filed Jan. 30, 2013.
(Continued)

*Primary Examiner* — Kenneth R Coulter
(74) *Attorney, Agent, or Firm* — Zilka-Kotab, P.C.

(57) ABSTRACT

In one embodiment, a method for providing virtual link aggregation (vLAG) includes forming a third logical port using a first logical port and a second logical port; determining first networking protocol state information corresponding to the third logical port using the first networking system, where the first networking protocol state information includes an indication of whether the first networking system is capable of communicating with the second networking system via an interswitch link (ISL) The method also includes storing a first networking protocol state information corresponding to the third logical port using the first networking system; communicating the first networking protocol state information to the second networking system via the and storing the first networking protocol state information using the second networking system.

9 Claims, 6 Drawing Sheets

(51) Int. Cl.
*H04L 12/709* (2013.01)
*H04L 12/26* (2006.01)

(58) Field of Classification Search
CPC ... H04L 45/58; H04L 43/0817; G06F 9/5077; G06F 9/5061; G06F 9/50; G06F 9/455; G06F 2213/0058; Y02B 60/33
USPC ........ 709/230, 228, 227, 229; 370/256, 254, 370/255
See application file for complete search history.

(56) References Cited

U.S. PATENT DOCUMENTS

| | | | | |
|---|---|---|---|---|
| 8,442,064 | B2* | 5/2013 | Singla et al. | 370/422 |
| 9,019,813 | B2* | 4/2015 | Li et al. | 370/217 |
| 9,106,565 | B2* | 8/2015 | Sait | H04L 45/18 |
| 9,231,821 | B2* | 1/2016 | Arumugam | H04L 41/0654 |
| 9,413,586 | B2 | 8/2016 | Lei et al. | |
| 2005/0058063 | A1* | 3/2005 | Masuyama | H04L 41/0663 370/217 |
| 2011/0085570 | A1 | 4/2011 | Kotha et al. | |
| 2011/0228767 | A1* | 9/2011 | Singla et al. | 370/389 |
| 2013/0064102 | A1* | 3/2013 | Chang et al. | 370/244 |
| 2013/0064137 | A1* | 3/2013 | Santoso et al. | 370/254 |
| 2013/0073711 | A1* | 3/2013 | Hanka et al. | 709/223 |
| 2013/0077621 | A1* | 3/2013 | Jacob Da Silva et al. | 370/355 |
| 2014/0192632 | A1* | 7/2014 | Sait | H04L 45/18 370/219 |
| 2014/0195694 | A1* | 7/2014 | Sait | H04L 45/18 709/239 |
| 2014/0211607 | A1* | 7/2014 | Li et al. | 370/219 |
| 2014/0215084 | A1 | 7/2014 | Lei et al. | |
| 2014/0294010 | A1* | 10/2014 | Biswas | H04L 45/245 370/392 |
| 2015/0138951 | A1* | 5/2015 | Arumugam | H04L 41/0654 370/225 |
| 2015/0172098 | A1* | 6/2015 | Agarwal | H04L 45/245 370/217 |
| 2015/0365270 | A1* | 12/2015 | Li | H04L 49/552 370/219 |

OTHER PUBLICATIONS

Non-Final Office Action from U.S. Appl. No. 13/754,749, dated Jul. 1, 2015.
Final Office Action from U.S. Appl. No. 13/754,749, dated Jan. 20, 2016.
Notice of Allowance from U.S. Appl. No. 13/754,749, dated Apr. 15, 2016.

* cited by examiner

US 9,641,380 B2

SPANNING TREE PROTOCOL (STP) IMPLEMENTATION ON AN EVENT DRIVEN VIRTUAL LINK AGGREGATION (VLAG) SYSTEM

RELATED APPLICATIONS

This application is a continuation of copending U.S. patent application Ser. No. 13/754,749, filed Jan. 30, 2013, which is herein incorporated, by reference.

BACKGROUND

The present invention relates to data center infrastructure and operation, and more particularly, this invention relates to enabling virtual Link Aggregation (vLAG) in a network system which operates spanning tree protocol (STP).

Generally, link aggregation allows a networking system backbone speed to grow incrementally as demand on the network increases by aggregating multiple physical networking ports or links within a single switch into a single logical link. Any traffic which is bound for this single logical link may be distributed across the multiple physical ports, Many standards exist to dictate how these aggregated ports are treated, set up, etc. Some examples of existing standards are 802.3ad port aggregation with link aggregation control protocol (LACP), 802.1AX, etc. All physical ports in the link, aggregation group must reside on the same physical switch, which in most scenarios will result in a single point of failure when the physical switch to which the physical links are connected goes offline, Link aggregation operates transparently to end-devices while providing redundancy and link resiliency for various networking protocols and speeds, e.g., Ethernet (10 Mbit/s, 100 Mbits, 1,000 Mbit/s, and/or 10 Gbit/s).

Therefore, there is as need for the ability to provide a quick and reliable method and system to prevent networking loops for the aggregation of multiple physical links spanning across at least two physical networking systems while still allowing for STP to he used in the network system

SUMMARY

In one embodiment, a method for providing vLAG includes forming a first logical port using one or more of a first plurality of physical networking ports comprised in a first networking system, forming a second logical port using one or more of a second plurality of physical networking ports comprised ma second networking system, forming a third logical pun using the first logical port and the second logical port, determining first networking, protocol state information corresponding to the third logical port using the first networking system, wherein the first networking protocol state information includes an indication of whether the first networking system is capable of communicating with the second networking system via an innerswitch link (ISL), storing a first networking protocol state information corresponding to the third logical port using the first networking system, communicating the first networking, protocol state information to the second networking system via the ISL, and storing the first networking protocol state information using, the second networking system.

Other aspects and embodiments of the present invention will become apparent from the following detailed description, which, when taken in conjunction with the drawings, illustrate by way of example the principles of the invention.

DETAILED DESCRIPTION

Figure 1:
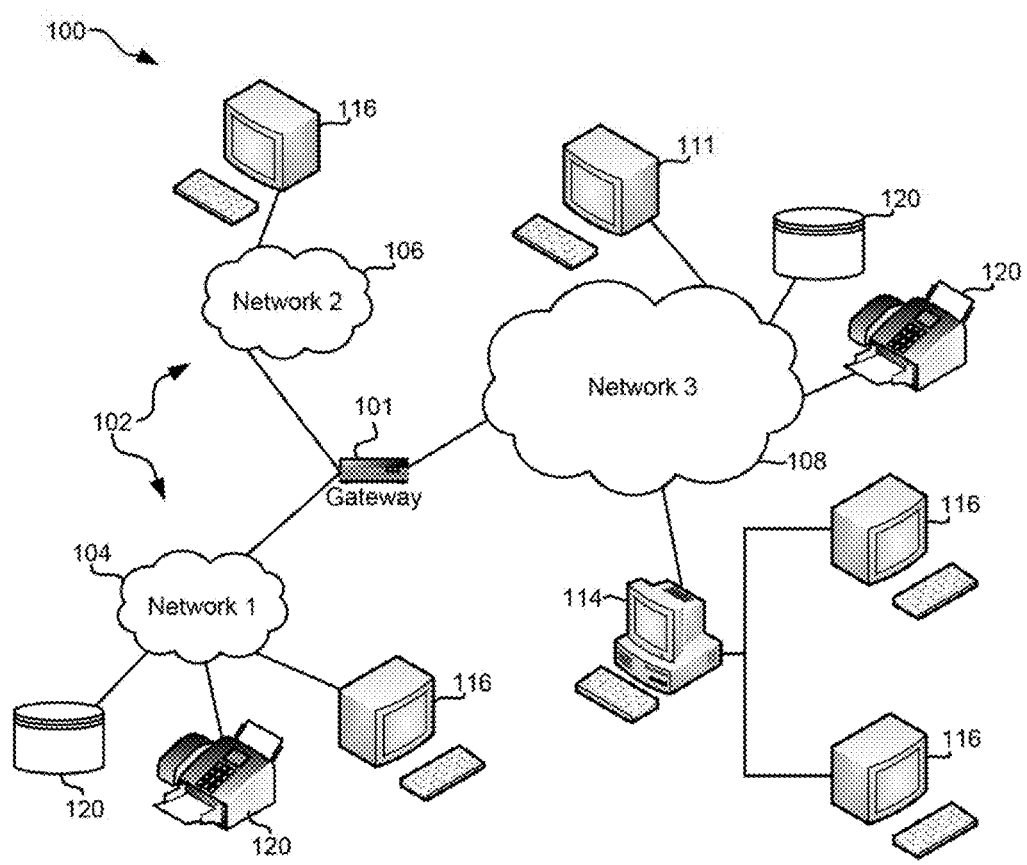
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a" "an," and the include plural referents unless otherwise specified.

In one general embodiment, a system includes a first networking system having a first plurality of physical networking ports, a first controller, and a first memory subsystem, with a first logical port being formed using one or more of the first plurality of physical networking ports; and a second networking system having a second plurality of physical networking ports, a second controller, and a second memory subsystem, with a second logical port being formed using one or more of the second plurality of physical networking ports; and logic adapted to form a third logical port using the first logical port and the second logical port, the first controller including logic adapted to store a first networking protocol state information corresponding to the third logical port using the first memory subsystem, the first networking system including logic adapted to communicate the first networking protocol state information to the second networking system, and the second controller including logic adapted to store the first networking protocol state information using the second memory subsystem.

In another general embodiment, a method for providing vLAG includes forming, a first logical port rising one or more of a first plurality of physical networking ports comprised in a first networking system, forming a second logical port using one or more of a second plurality of physical networking ports comprised in a second networking system, forming a third logical port using the first logical port and the second logical port, determining first networking protocol state information corresponding to the third logical port using the first networking system wherein the first networking protocol state information includes an indication of whether the first networking system is capable of communicating with the second networking system via an inter-switch link (ISL), storing a first networking protocol state information corresponding, to the third logical port using the first networking system, communicating the first networking protocol state information to the second working system via the ISL, and storing the first networking protocol state information using the second networking system.

In yet another general embodiment, a computer program product for providing a vLAG includes a computer readable storage medium having program code embodied therewith, the program code readable/executable executable by one or more devices to: form a first logical port using one or more of a first plurality of physical networking ports comprised in a first working system; form a second logical port using one or more of a second plurality of physical networking ports comprised in a second networking system; form a third logical port using the first logical port and the second logical port; determine first networking protocol state information corresponding to the third logical port using the first networking, system, wherein the first networking protocol state information includes an indication of whether the first networking system is capable of communicating with the second networking system via an ISL; store a first networking protocol state information corresponding to the third logical port using the first networking system; communicate the first networking protocol state information to the second networking system via the ISL; and store the first networking protocol state information using the second networking system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of a non-transitory computer readable storage medium include the following, a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using, an Internet Service Provider (ISP).

Aspects of the present invention are described herein with reference to flowchart illustrations and/or block diagrams of methods, apparatuses (systems), and computer program products according to various embodiments of the invention. It will understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that n ay direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSIN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in sonic embodiments.

A peripheral 129 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a duster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
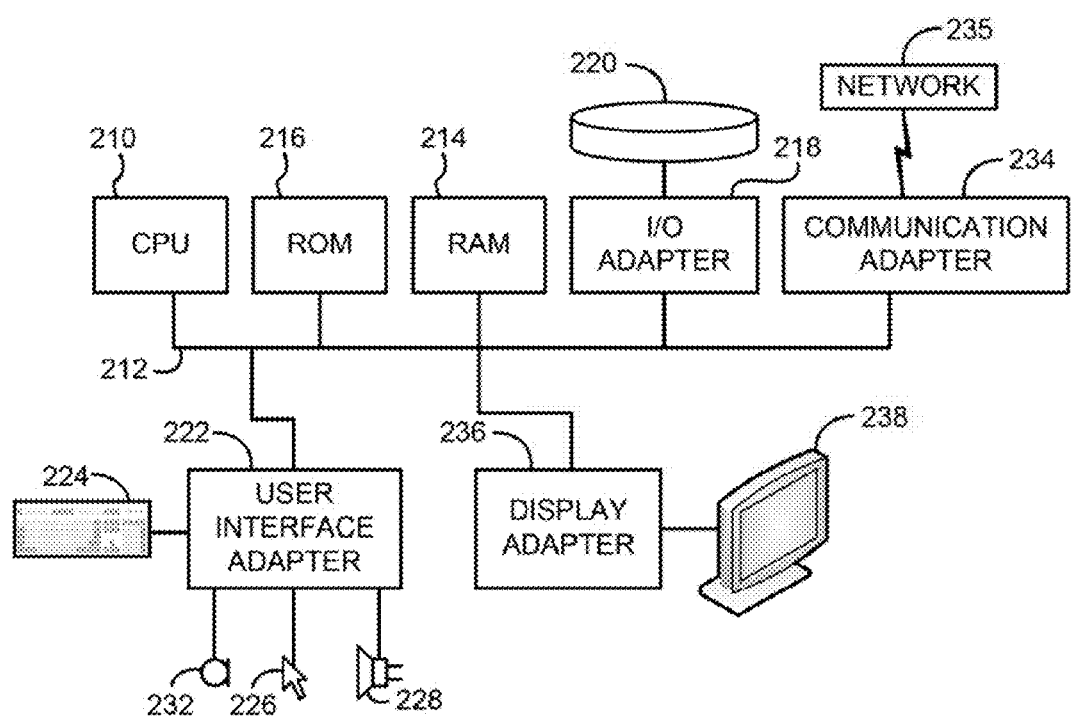
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an 110 adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment ma also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
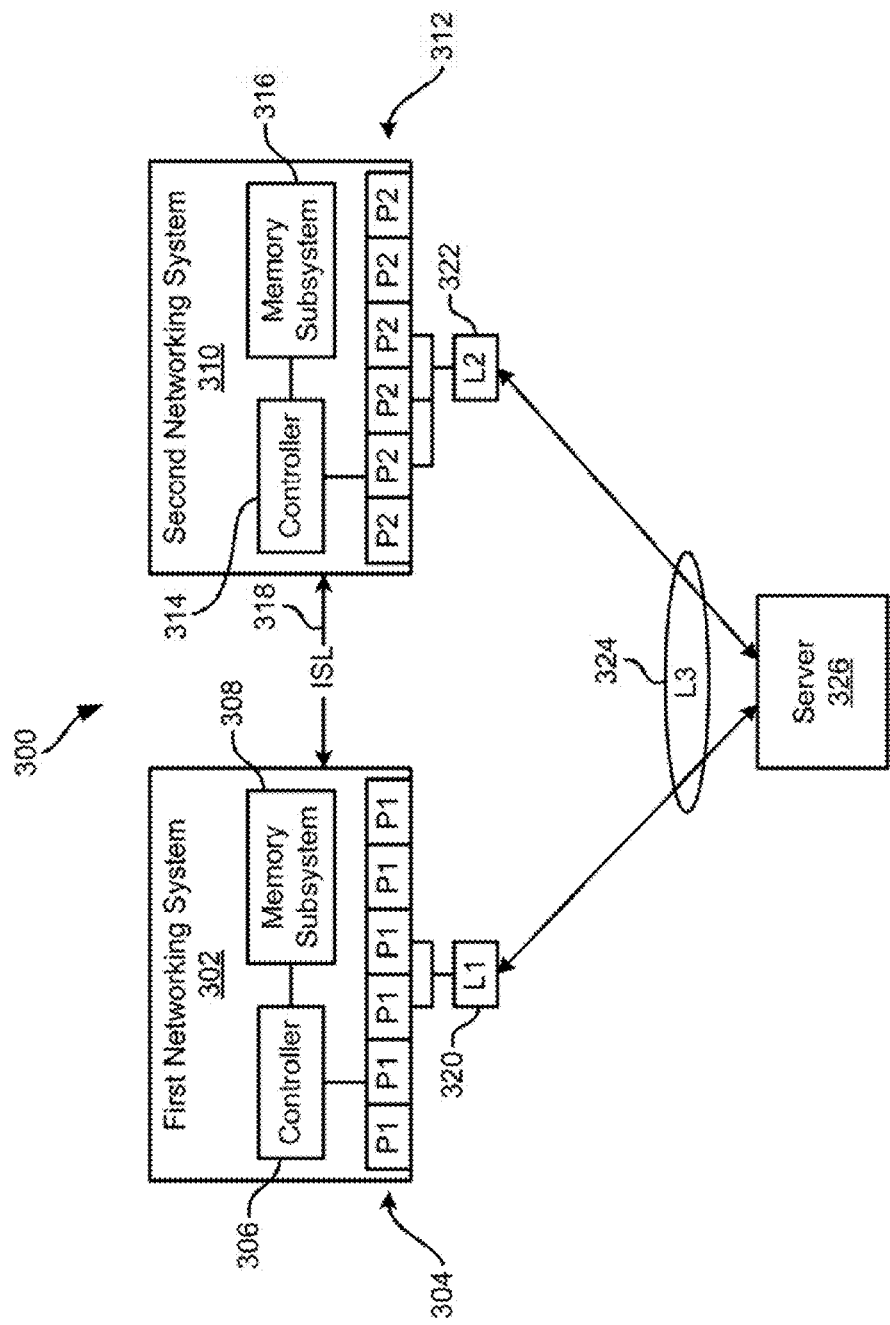
FIG. 3 is a simplified diagram of a networking system, according to one embodiment.

Referring now to FIG. 3, a networking system 300 is shown according to one embodiment. The networking system 300 comprises a first networking system 302, such as a switch, router, Ethernet network, etc., which includes a plurality of first physical networking ports 304 (P1), a first controller 306, and a first memory subsystem 308. The first physical networking ports 304 are capable of sending and receiving traffic across network connections from any other network device.

The networking system 300 also comprises a second networking system 310, such as another switch, router, Ethernet network, etc., which includes a plurality of second physical networking ports 312 (P2), a second controller 314, and a second memory subsystem 316. The second physical networking ports 312 are capable of sending and receiving traffic across network connections from any other network device, The first controller 306 and the second controller 314 are configured for managing and controlling functions and operations of the their respective networking system. Each controller may include a processor of a type suitable for operating a networking system, such as a central processing unit (CPU), microcircuit or microchip, field programmable gate array (FPGA) integrated circuit (IC), application specific integrated circuit (ASIC), etc.

In addition, the first memory subsystem 308 and the second memory subsystem 316 are adapted to store information for use by any system, processor, and/or logic of their respective networking system, such as the controller, as would be understood by one of skill in the art. Each memory subsystem may include non-transitory computer readable storage media, such as RAM, ROM, Flash memory, EPROM, etc. Furthermore, each memory subsystem may include any additional components and/or modules as would be useful in, storing, and retrieving data from the memory subsystem, such as a memory controller, connections, I/O interfaces, etc.

In their simplest forms, the memory subsystems may be computer readable storage media capable of storing data for use by their respective controller.

An interswitch link (ISL) 318 may be provided between the first networking system 302 and the second networking system 310. The ISL 318 may be used for communication between the two networking systems, as would be understood by one of skill in the art.

In addition, the networking system 300 also comprises a server or networking device 326 (such as a workstation, switch, router, end host, etc.) connected to the first and second networking systems 303, 310, as would be understood by one of skill in the art.

The networking system 300 is configured to form a first logical port 320 (L1) using one or more physical networking ports of the plurality of first physical networking ports 304. In FIG. 3, two physical networking, ports (P1) are shown being used to form the first logical port 320, but any number may be used, such as one, two, three, four, five, eight, ten, etc. The networking system 300 is also configured to form a second logical port 322 (L2) using one or more physical networking ports of the second plurality of physical networking ports 312. In FIG. 3, three physical networking ports (P2) are shown being used to form the second logical port 322, but any number may be used.

Additionally, according to one embodiment, the networking system 300 is configured to form a third logical port 324 (L3) using the first logical port 320 and the second logical port 322, the third logical port 324 connecting to the server or networking device 326. The third logical port 324, according to one embodiment may be a virtual link aggregation (VLAG) port, as would be understood by one of skill in the art. To make this third logical port 324 accessible to components of the networking system 300, the first controller 306 stores a first networking protocol state information corresponding to the third logical port 324 using the first memory subsystem 308, and the first networking system 302 communicates the first networking protocol state information to the second networking system 310. Furthermore, the second controller 314 stores the first networking protocol state information using the second memory subsystem 316.

According to yet another embodiment, the possibility of using multiple mechanisms to handle link failures is provided. This provides even greater support for link failures to reduce or eliminate dropped packets and/or misrouted data due to failed links.

In networking systems involving multiple networking systems connected via one or more ISLs, typically there are four states that the various networking systems may be in. Both systems up and running ("FORMED"), local system up and running but not informed of remote system's status or remote system's status is not up ("LOCAL-UP"), local system down but remote system up ("REMOTE-UP"). and both local and remote system not up, but possibly initializing ("MIT").

Now referring to FIGS. 4A-4D, relationships between the first networking system 302 and the second networking system 310 are shown in various vLAG states.

Figure 4A:
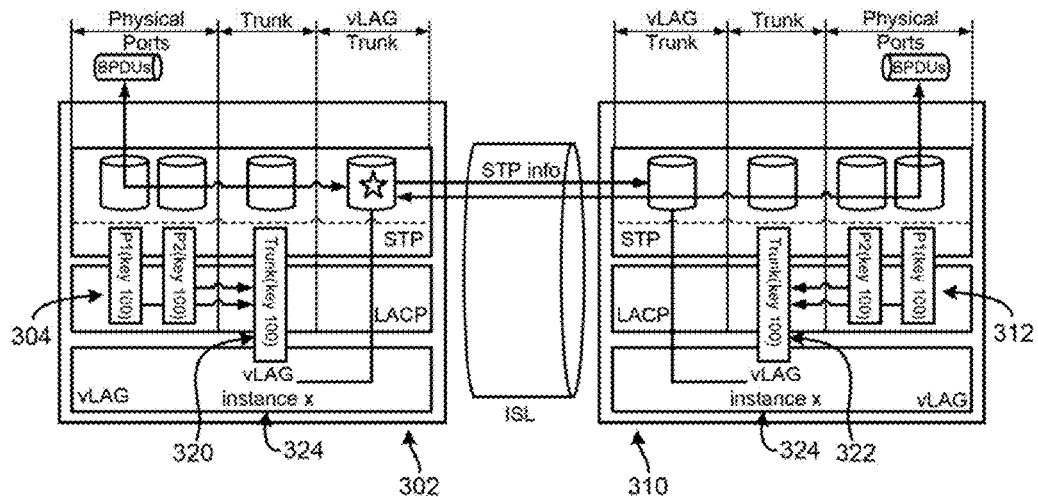
FIGS. 4A-4D show relationships between a first networking system and a second networking system in various virtual link aggregation (vLAG) states, according to several embodiments.

In FIG. 4A, the first networking system 302 is acting as the primary or master (as denoted by the star) and the underlying LAG 320 (the first logical port) is up and running properly. Here, STP information (such as the first networking protocol state information corresponding to the third logical port 324) is communicated to the second networking system 310 using the ISL. The one or more physical ports (P1, P2, etc.) of the first plurality of physical ports 304 are grouped together into a first logical port 320, Similarly, the one or more physical ports (P1, P2, etc.) of the second plurality of physical ports 312 are grouped together into a second logical port 322. Since each underlying LAG is functioning properly, the first networking system 302, as the primary, controls the exchange of information about the third logical port 324 formed from the first logical port 320 and the second logical port 322, an instance of which exists on each of the first and second networking systems as vLAG instance x.

Figure 4B:
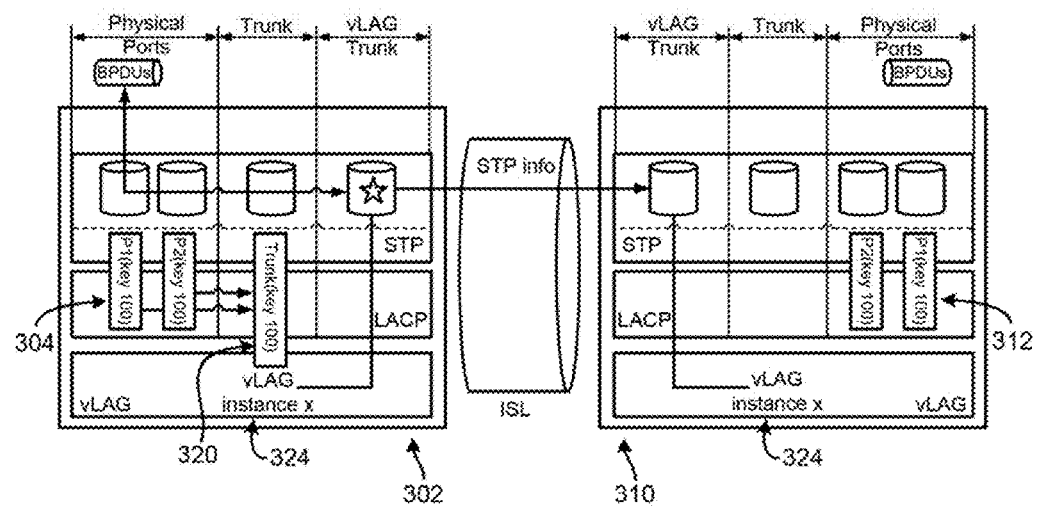
Figure 4C:
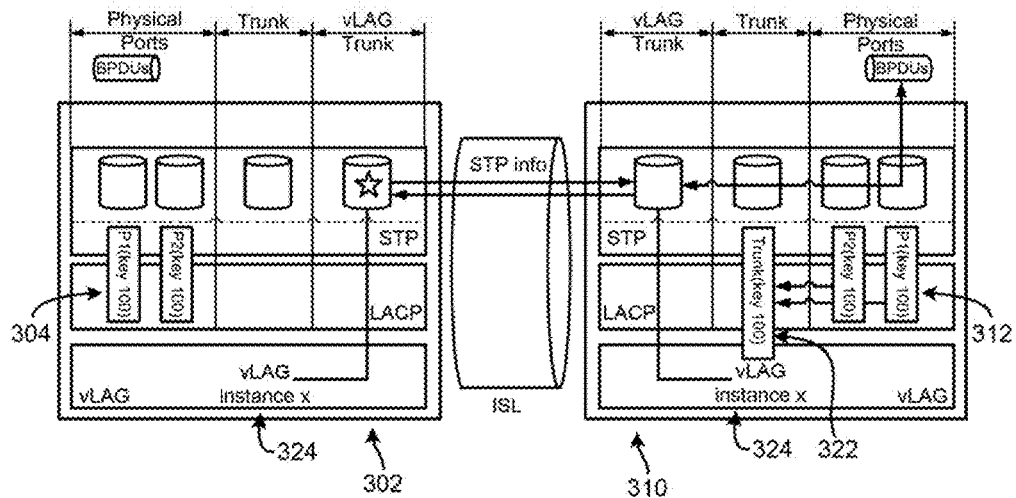
Figure 4D:
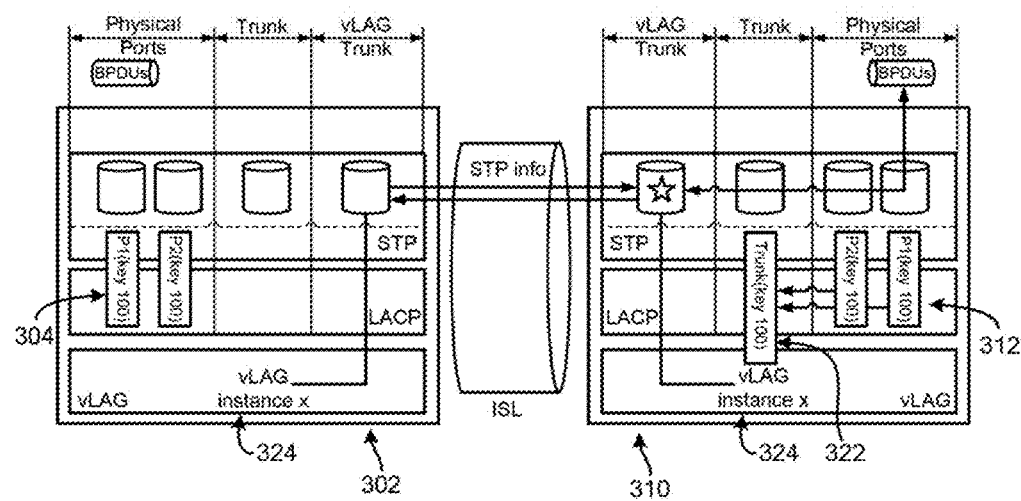

Now referring to FIG. 4B, when the primary underlying LAG 320 is up and running, but the secondary underlying LAG is down, it can be seen that an instance of the vLAG is still available to the second networking system 310 due to the exchange of information controlled by the first networking system 302 over the ISL. Similarly, referring to FIG. 4C, when the first logical port on the first networking system 302 is down, but the second logical port 322 on the second networking system is up, it ran be seen that an instance of the vLAG 324 is still available to the first networking system 302 due to the exchange of information controlled by the first networking system 302 over the Now referring to FIG. 4D, in a scenario where the second networking system 310 becomes the primary or master, as denoted by the star, the instance of the vLAG 324 is still available to the first networking system 302 due to the exchange of information over the ISL, but the information is now controlled by the second networking system 310.

In one approach, primary and secondary networking systems 302, 310 expand their trunk by the vLAG instance, and the expanded trunk IDs may be used for vLAG trunks. All the spanning tree protocol (STP) calculations of the underlying LAGs are performed on those vLAG trunks. A vLAG trunk may be found by the vLAG instance, and the vLAG instance is static. If an underlying LAG is configured into vLAG and either local or peer underlying LAG is up, a vLAG trunk will be created and the original LAG may be replaced by the vLAG in STP. STP-Masters are always on the primary system, and the primary system synchronizes the STP information to the peer system corresponding expanded trunk. Any non-vLAG ports run STP as would be done normally without the additional vLAG considerations described herein.

Figure 5:
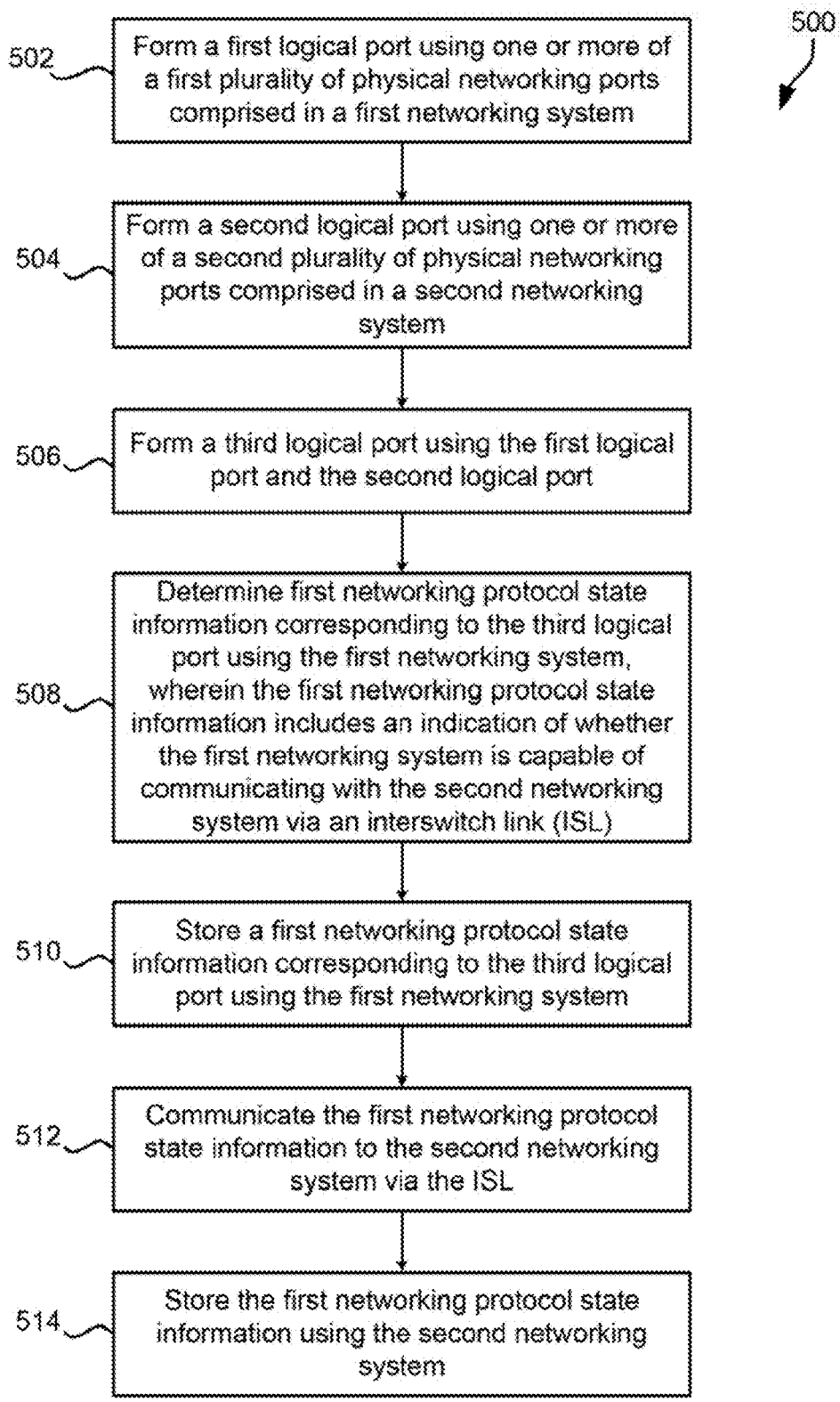
FIG. 5 shows as flowchart of a method, according to one embodiment.

Now referring to FIG. 5, a flowchart of a method 500 for providing a vLAG is shown, according, to one embodiment. The method 500 may be performed in accordance with the present invention in any of the environments depicted in FIGS. 1-4D, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a networking system, a switch, a router, a processor (such as a CPU, an ASIC, an FPGA, etc.), a controller, a server, etc., or any other suitable device or component of a networking system.

As shown in FIG. 5, method 500 may initiate with operation 502, were a first logical port is formed using one or more of a first plurality of physical networking ports comprised in a first networking system. The first logical port may represent any number of the physical ports of the first networking system.

In operation 504, a second logical port is formed using one or more of a second plurality of physical networking ports comprised in a second networking system. The second logical port may represent any number of the physical ports of the second networking system In operation 506, a third logical port is formed using the first logical port and the second logical port. In one approach, the third logical port may comprise a vLAG.

In operation 508, first networking protocol state information corresponding to the third logical port is determined using the first networking system. The first networking protocol state information includes an indication of whether the first networking system is capable of communicating with the second networking system via an ISL therebetween (or possibly through some other link between the systems).

In one embodiment, the first networking protocol state information corresponding to the third logical port may be determined using STP.

In operation 510, a first networking protocol state information corresponding to the third logical, port is stored using the first networking system, such as in a first memory subsystem of the first networking system in one approach.

In operation 512, the first networking protocol state information is communicated to the second networking system via the ISL (or possibly through some other link between the systems).

In operation 514, the first networking protocol state information is stored using the second networking system, such as in a second memory subsystem of the second networking system in one approach.

In one embodiment, the method 500 may further comprise initiating a first procedure upon determination that the first networking system is capable of communicating with the second networking system and activating at least one of the first plurality of physical networking ports in response to the first procedure. The first procedure may create a vLAG trunk which may replace an original LAG in STP for purposes of determining, a tree structure of the overall networking system.

in another embodiment, the method 500 may further comprise coupling the first networking, system to a third networking system using, a second ISL (or some other suitable link). The third networking system may include a third plurality of physical networking ports, and the method 500 may also include coupling the second networking system to the third networking system using a third ISL, forming a fourth logical port using one or more of the third plurality of physical networking ports, and establishing a fifth logical port between the third networking system and each of the first networking system and the second networking system using either; the first, second, and fourth logical ports, or the third and fourth logical ports. In one embodiment, the third and fifth logical ports may each comprise a vLAG.

In this way, load balancing across the vLAG of the fifth logical port may be accomplished by either load balancing across each of the logical ports of each individual networking system, or across the vLAG of the third logical port and the fourth logical port of the third networking system.

In one embodiment, the initiating of the first procedure may be based at least in part on a first programmable delay value, such that a predetermined amount of time may be waited prior to activating ports of the first networking system in response to the first procedure.

In another embodiment, when the first networking system is rebooted, the second plurality of networking ports may be maintained in a disabled state.

The method 500 may be performed, in various embodiments comprising all or some of the operations described in FIG. 5, in computer program products, other methods, logic, and/or systems, such as the networking system 300 described in relation to FIG. 3, among others.

In one such embodiment, a computer program product for providing a vLAG comprises a computer readable storage medium having computer readable program code embodied therewith. The computer readable program code comprises program code readable/executable by one or more devices to form a first logical port using one or more of a first plurality of physical networking ports comprised in a first networking system; form a second logical pan using one or more of a second plurality of physical networking ports comprised in a second networking system; form a third logical port using the first logical port and the second logical port; determine first networking protocol state information corresponding to the third logical port using the first networking system, wherein the first networking protocol state information includes indication of whether the first networking system is capable of communicating with the second networking system via an interswitch link (ISL); store a first networking protocol state information corresponding to the third logical port using the first networking system; communicate the first networking protocol state information to the second networking system via the ISL; and store the first networking protocol state information using the second networking system.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method comprising:
forming, using a first circuitry, a first logical port using one or more of a first plurality of physical networking ports comprised in a first networking system;
forming a third logical port using the first logical port and a second logical port of a second networking system;
determining first networking protocol state information corresponding to the third logical port using the first circuitry of the first networking system, wherein the first networking protocol state information includes an indication of whether the first networking system is capable of communicating with the second networking system via an interswitch link (ISL);
storing a first networking protocol state information corresponding to the third logical port using the first circuitry of the first networking system; and
communicating the first networking protocol state information to the second networking system via the ISL;
wherein in response to a determination that the first networking system is rebooted, causing a second plurality of networking ports of the second networking system to be maintained in a disabled state.

2. The method as recited in claim 1, wherein the first networking protocol state information corresponding to the third logical port is determined using spanning tree protocol (STP), wherein the first logical port comprises a link aggregation (LAG), and wherein the third logical port comprises a virtual link aggregation (vLAG), an instance of the vLAG being static.

3. The method as recited in claim 1, further comprising:
initiating a first procedure upon determination that the first networking system is in communication with the second networking system via the ISL; and
activating at least one of the first plurality of physical networking ports in response to the first procedure.

4. The method as recited in claim 3, wherein the initiating of the first procedure is based at least in part on a first programmable delay value.

5. The method as recited in claim 1, further comprising:
coupling the first networking system to a third networking system using a second ISL, wherein the third networking system includes a third plurality of physical networking ports;
coupling the second networking system to the third networking system using a third ISL;
forming a fourth logical port using one or more of the third plurality of physical networking ports; and establishing a fifth logical port between the third networking system and each of the first networking system and the second networking system using either:
the first, second, and fourth logical ports; or
the third and fourth logical ports.

6. The method as recited in claim 5, wherein the third and fourth logical ports each comprise a virtual link aggregation (vLAG).

7. The method as recited in claim 1, further comprising:
monitoring a formation state of the third logical port using the first circuitry of the first networking system;
updating the first networking protocol state information using the first circuitry of the first networking system; and
communicating the updated first networking protocol state information to the second networking system via the ISL.

8. The method as recited in claim 1, further comprising:
monitoring, using the first circuitry of the first networking system, a formation state of the first logical port using at least one parameter value associated with the one or more of the first plurality of physical networking ports; and
maintaining, using the first circuitry of the first networking system, the formation state of the first logical port based on at least one active physical port of the one or more of the first plurality of physical networking ports.

9. The method as recited in claim 1, wherein the first networking protocol state information corresponding to the third logical port is set to one of four states: "FORMED" indicating that the first and second networking systems are up and running, "LOCAL-UP" indicating that the first networking system is up and running but not informed of a status of the second networking system or the second networking system is not up, "REMOTE-UP" indicating that the first networking system is down but the second networking system is up, and "INIT" indicating that the first and second networking systems are not up.

* * * * *